June 9, 1964 G. G. DELPLACE ETAL 3,136,423

DOCUMENT PROCESSING SYSTEM

Filed Feb. 26, 1962 3 Sheets-Sheet 1

INVENTORS.
GERARD G. DELPLACE
BY JEAN L. HUCHANT

ATTORNEY

Inventors
GERARD GEORGES DELPLACE
JEAN LOUIS HUCHANT
By [signature]
Attorney

DOCUMENT PROCESSING SYSTEM

Filed Feb. 26, 1962 3 Sheets-Sheet 3

Inventors
GERARD GEORGES DELPLACE
JEAN LOUIS HUCHANT
By [signature]
Attorney

United States Patent Office 3,136,423

Patented June 9, 1964

3,136,423

DOCUMENT PROCESSING SYSTEM

Gerard Georges Delplace and Jean Louis Huchant, Antwerp, Belgium, assignors to International Standard Electric Corporation, New York, N.Y., a corporation of Delaware Filed Feb. 26, 1962, Ser. No. 175,624
Claims priority, application Netherlands Feb. 28, 1961
4 Claims. (Cl. 209—111.5)

The present invention relates to a document processing system including an input mechanism for periodically feeding documents to a conveyor along which each document is transferred to one of a plurality of output positions arranged along said conveyor, and including control and memory means for registering a plurality of code representations corresponding to the output positions to which the documents processed along said conveyor are to be transferred, each of said code representations being stepped through said memory means in synchronism with the actual physical displacement of the document to which it relates.

Such a machine is already known in the document sorting arts, but therein the above code representations associated with said documents, which representations are hereinafter called output informations, are transferred through said control and memory means in synchronism with the movement of the documents only by virtue of the fact that the distances between successive documents are fixed, e.g. the documents are transported in conveying bins fixedly attached to a conveyor moving at a constant speed, so that there exists a perfect synchronism between the movements of the documents and of the conveyor and hence also between the documents themselves, so that the time at which any document reaches the associated output position is predetermined without reference to the actual document position.

However, when processing documents which are not fixedly attached to the conveyor, e.g. when processing flat documents which rest loosely on their edges as they are transported between conveying belts or between driving rollers, the distances between the successive documents tend to vary, although these distances are approximately identical at the moment the documents leave the input position due to the periodicity of operation of the input mechanism. These differences may for instance be caused by the conveyor not being uniform everywhere, e.g. one driving roller may be more effective than others, or by the different documents not being completely identical to one another in size, and so forth.

By virtue of the lack of synchronism associated with the aforesaid differences, it will therefore be impossible, to use the conventional system to transfer loosely held documents to their correct output positions.

It is therefore an object of the present invention to provide a document processing machine by means of which documents loosely carried on a conveyor without being fixedly attached to it, may be reliably transferred to their correct output positions.

The present document processing machine is characterized by the fact that said output informations are stepped through said memory means under the direct control of said loosely held documents.

The present document processing machine is also characterized by the fact that said control and memory means comprise at least one register unit including a succession of $n$ interconnected register stages, each of which is associated with an output position, and a buffer stage connected to the nth register stage, except when there is no following unit, $n$ detecting means each associated to one of $n$ output positions of the unit and each serving to detect the passage of a document, comparison means cooperating with said $n$ detecting means for indicating the first detection of a document in a group of documents to be detected by said $n$ detecting means, and advancing means for advancing, upon said first document detection, the respective output informations of said group of documents into successive ones of the $n$ register stages of the unit, said advancing means being associated with delay means for advancing the information from the nth register stage into the following buffer stage after a predetermined delay.

In the following it will be assumed that each detecting means includes a photocell and that each document is detected by the photocell as the trailing edge of the document passes the photocell, at which moment the photocell controls advancing means which shift the output information concerning the document to the appropriate register stage.

With regard to the above comparison means it is noted that when each of them is associated with one and only one photocell, they are superfluous, as their functions defined above, are then fulfilled by the photocells.

It should also be noted that it is not possible to control the shifting of the output informations of the documents by means of the photocells without making use of either the above comparison means or of said buffer stages. Indeed, suppose that this were the case and consider two consecutive documents moving along the conveyor. It may then happen that the trailing edge of the first document (in the direction of travel), passes a given photocell after the trailing edge of the second document has passed the immediately preceding photocell. In this case, the latter photocell controls advancing means which will try to shift the output information concerning the second document towards the associated i.e. the immediately following register stage. This will however be incorrect since the output information concerning the first document is still stored in the said following register stage. Hence, information will be lost.

The necessity of the above comparison means and of said buffer stages will now be explained and from the following it will also become clear that when the number of buffer stages is decreased, the complexity of the comparison means is increased, whereas when the number of buffer stages is increased the comparison means become simpler.

According to a first solution, a document processing machine comprises a number of units, as defined above, equal to the total number of output stages. This means that successive pairs of register stages are separated by a buffer stage and that upon a document passing a photocell its output information is transferred into a register stage associated with that photocell, and at a time interval later this same output information is transferred from the last mentioned register stage to the following buffer stage.

As already mentioned above no comparison means are required in this case.

Considering again the above two consecutive documents, the output information concerning the second document is shifted from the immediately preceding buffer stage to the next stage, as that document passes the associated photocell, and then after a predetermined time interval, into the following buffer stage. In this manner it is clear, that the output information of the second document will not be lost providing the first document has passed its associated photocell within the above predetermined time interval, in which case the information concerning the first document is shifted from the preceding buffer stage to the next register stage. Therefore the above time interval should be made sufficiently large.

In general, considering two consecutive groups of documents each corresponding to a different unit, the above predetermined time interval should be so chosen that the delay of the fastest document of the first group, with respect to the fastest document of the second group, is not larger than this time interval.

The above solution requires a large number of buffer stages and from this viewpoint it is rather complex. However the comparison means are not required due to their role being fulfilled by the detecting means so that the above complexity due to the large number of buffer stages is compensated for by the elimination of the comparison means.

According to another solution, a document processing machine comprises only a single *n*-stage unit, so that no buffer stages between units are required. The comparison means must however be designed for detecting that particular document out of all the documents situated along the conveyor, the lagging edge of which first passes the photocell in front of which it is actually moving. The first passed photocell then controls the advancing means in order to shift the output informations of all of the above documents from the register stages wherein they are actually registered to the following register stages. Hence again no information is lost.

It is however clear that such comparison means are complex, especially when the number of output stages is high and this may destroy the advantage provided by the elimination of buffer stages.

According to a preferred solution, the present document processing machine comprises a number of units equal to half the total number of output stages. This means that each pair of register stages is separated by a buffer stage and that each unit comprises two photocells each associated to a register stage and to an output position. In brief the operation of this embodiment is as follows: again considering two documents travelling in front of the above photocells, a comparison means indicates the first detection of the passage of one of these documents past its photocell. This particular photocell then controls advancing means for advancing simultaneously the output informations of the first document from a preceding buffer stage to the register stage associated with the first photocell and of the second documents from the latter register stage to the register stage associated with the second photocell. After a predetermined time interval, the information registered in the last mentioned register stage is transferred to the following buffer stage.

As will become clear from the following description, this solution has the advantage of reducing the number of required buffer stages, without undue complication of the comparison means required in association with such a reduction means.

The above mentioned and other objects and features of the invention will become more apparent and the invention itself will be best understood by referring to the following description taken in conjunction with the accompanying drawings wherein.

It should first be noted that each monostable device discussed below, except when the contrary is specified, includes a differentiator circuit, so situated that upon the device being actuated to its unstable condition by an actuating signal applied to its 1-input, an actuating trigger pulse will appear at its 0-output only at the end of the unstable operation.

It should also be noted that the output of a photocell is deactivated when a document jacket is situated in front of it and that it becomes activated upon the jacket leaving it.

Figure 1:
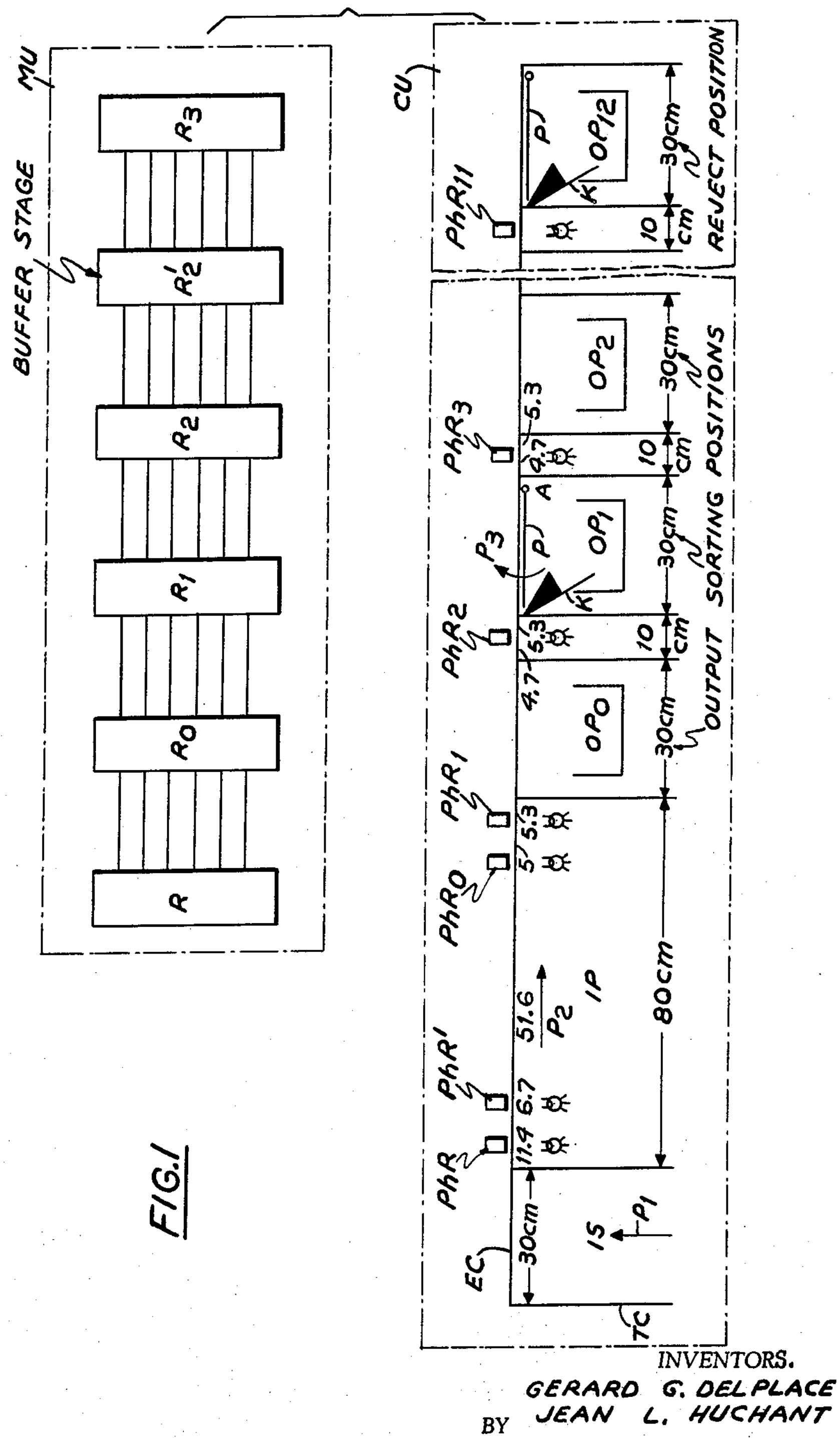
FIG. 1 is a simplified schematic view of the conveyor and of the control and memory means included in the document processing machine according to the present invention.

Principally referring to FIG. 1, the present document processing machine includes a conveyor unit CU comprising an edgewise conveyor EC to which an input mechanism (not shown) periodically feeds from a transverse conveyor TC, flat documents such as cheques, each enclosed in a jacket of the type disclosed in the British Patent No. 815,171 (J. Young, 2), issued in October, 1959, and having a length of about 30 cm. These jackets are displaced along the conveyors TC and EC in the direction of the arrows P1 and P2 respectively. In the present instance the input mechanism is operated at 140 millisecond intervals, and the average speed of the documents along the conveyor is chosen to be approximately $$\frac{40 \text{ centimeters}}{140 \text{ milliseconds}}$$

for reasons discussed below.

Along the edgewise conveyor are arranged an input stage IS having a length of 30 cm., an intermediate position IP having a length of 80 cm. and a number of output positions $OP_0$ to $OP_{12}$, of which, for the sake of simplicity, only $OP_0$, $OP_1$ and $OP_2$ have been shown. Reject position $OP_{12}$ is also shown. These output positions each have a length of 30 cm. and they are separated from each other by 10 cm. For each of the output positions $OP_{0-12}$ there is a corresponding article detecting photocell $PhR_{0-12}$, only $PhR_{0-3,11}$ being shown in FIG. 1. Each output position also includes a points mechanism of the type described in the Belgian Patent No. 568,796 (J. B. de Peuter-H. Verhoeven 7-1), one such points mechanism being schematically indicated in the output position $OP_1$ and one in the output (reject) position $OP_{12}$. Each points mechanism includes a diverter plate P which is able to pivot about the axis A under the action of a points electromagnet (not shown) and also a guide plate K. In the position of the diverter plate shown at $OP_1$, jackets moving along the edgewise conveyor EC will not be diverted at $OP_1$, but if the plate P is displaced in the direction of the arrow $P_3$, in response to excitation of the above-mentioned electromagnet, a document passing position $OP_1$ will be diverted away from the conveyor EC into the output position.

In addition to the photocells $PhR_{0-12}$ photocells PhR and PhR′ are provided at the beginning of the intermediate position IP and at a distance of about 6.7 cm. from each other, the photocell PhR being 11.4 cm. from the right hand of the input stage IS. Photocells $PhR_0$ and $PhR_1$ are mounted at the end of the intermediate position at a distance of 5 cm. from each other, the photocell $PhR_1$ being at 5.3 cm. from the left hand end of the output position $OP_0$.

To each output position $OP_{0-12}$ there is associated a correspondingly designated register $R_{0-12}$. It is intended that the outputs of the latter control the positions of the above-mentioned points mechanisms at the respectively associated output positions. The intent thus is to have output destination information shift through the registers $R_{0-12}$ in synchronism with the jackets to be sorted so that during the passage of a given jacket through an output position the destination of that jacket will be stored in the associated register, and therefore so that at the destination output position the associated points mechanism will be operated during the entire passage of the given jacket to properly divert it. This poses a problem because at any time there may or may not be a full complement of jackets travelling on the conveyor and, as previously indicated, the jackets may not be correctly spaced at 40 cm. intervals. Thus, it may not be possible to simultaneously advance the associated destination information in all of the registers $R_{0-12}$ without running the risk of prematurely or belatedly operating some of the points mechanisms. One solution would be to include within each of the registers $R_{1-11}$ the facility to accept and store information from the preceding register at random and to transfer information to the succeeding register at random, while controlling the associated points mechanism only during the prescribed movement of a jacket past the associated output position. This being obviously very costly and complicated, we have devised a simpler solution which is described below.

Figure 2:
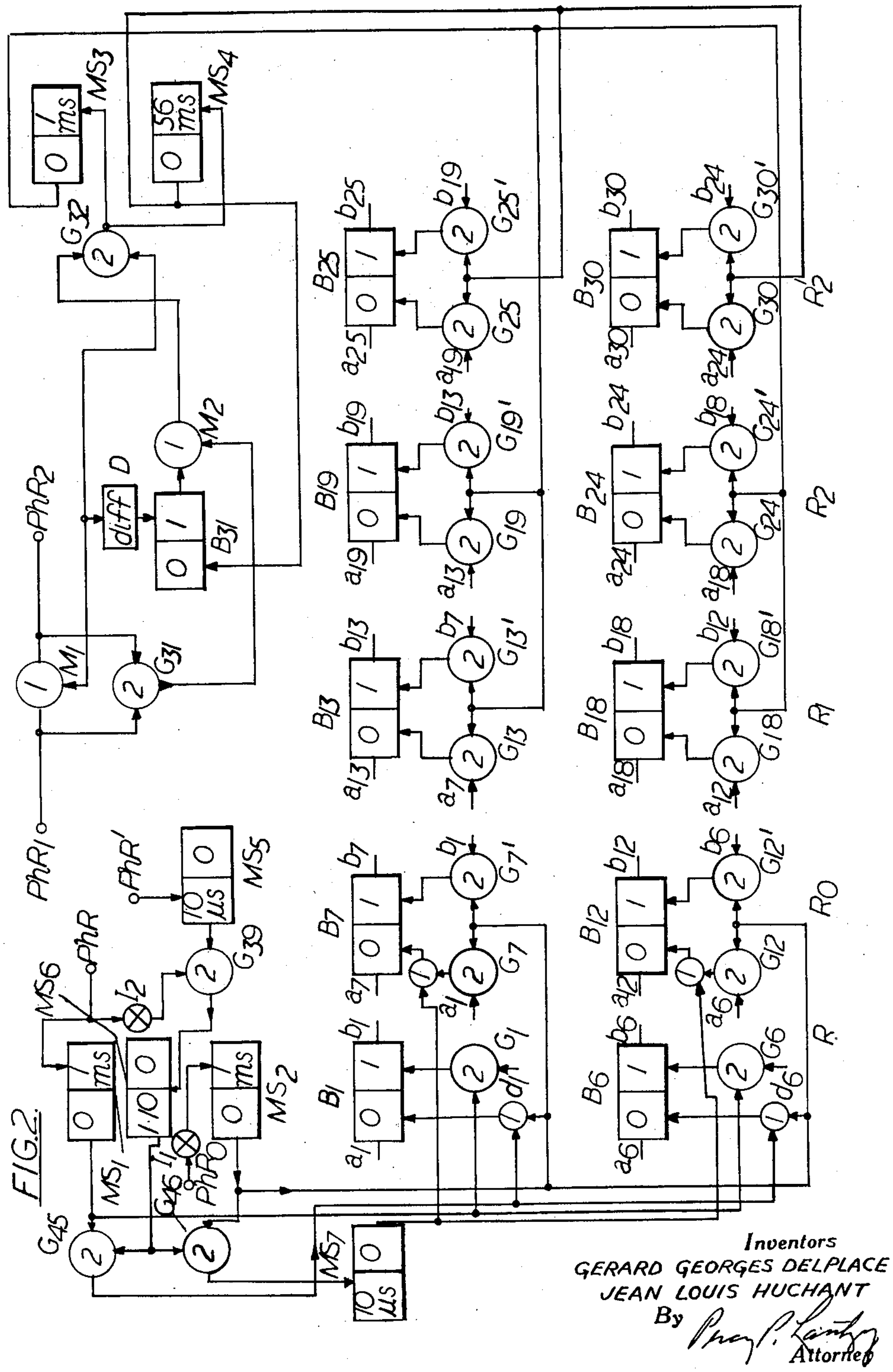
FIG. 2 is a detailed view of the above control and memory means.

As indicated in FIG. 2, the photocell $PhR$ delivers an actuating signal when the trailing edge of a jacket leaves it, whereupon the output information concerning that jacket is entered in the register stage R of the memory unit MU by means not shown, as such means are common to all prior art systems of the subject type. The photocell $PhR'$ serves in cooperation with the photocell $PhR$, to detect an improper spacing between two consecutive jackets. The photocell $PhR_0$ is associated with the register stage $R_0$ and the output position $OP_0$ and delivers, through inverter $I_1$, an actuating signal which is used to shift the information from the register stage R to a register stage $R_0$ associated with output position $OP_0$ upon the leading edge of a jacket arriving in front of the photocell. The photocell $PhR_1$ is associated with register stage $R_1$ and output position $OP_1$ and delivers an actuating signal, which may be used to shift the information from the register stage $R_0$ to the register stage $R_1$, upon the trailing edge of a jacket leaving the photocell. The other photocells, $PhR_{2-12}$ are mounted at a distance of 40 cm. from $PhR_1$ and from each other and each delivers an actuating signal, which may be used to shift the information from a preceding register stage to an associated register stage $R_{2-12}$, upon the trailing edge of a jacket leaving the photocell. These photocells, are further each mounted between two consecutive output positions and at a distance of 5.3 cm. from the second of these two output positions.

In accordance with the present invention, a buffer register is serially connected between each pair of registers beginning with the pair $R_2$, $R_3$. The buffer registers are designated by the same subscript number as the first register of the corresponding pair, and with the prime symbol ′. Thus between $R_2$ and $R_3$ we provide a buffer register $R_2'$, and similarly we provide buffer registers $R_4'$, $R_6'$, $R_8'$, and $R_{10}'$ following registers $R_4$, $R_6$, $R_8$, and $R_{10}$ respectively. These buffer registers co-operate with the other registers in a manner described below with reference to the buffer register $R_2'$, the description being equally applicable to the remaining registers and buffer registers.

Principally referring to FIG. 2, the above register stages R, $R_0$, $R_1$, $R_2$ and the buffer stage $R_2'$ have been represented in detail. They include the bistable devices $B_{1-6}$, $B_{7-12}$, $B_{13-18}$, $B_{19-24}$ and $B_{25-30}$ respectively.

As indicated above, after a jacket has been transferred from the transverse conveyor TC to the edgewise conveyor EC, it is displaced along the edgewise conveyor and at the moment its leading edge arrives in front of the photocell PhR (FIG. 1) information inscribed on the jacket is read by means not shown.

This information is, for instance, the bank name appearing on the cheque. It is supposed that one out of twelve different bank names may appear on the cheque and that this cheque in accordance with this bank name, has to be transferred to the corresponding one of the above twelve output positions $OP_{0-11}$, the output position $OP_{12}$ being a reject position. The above twleve possible bank names and output positions are characterized by the following code numbers or so called output informations

| | |
|---|---|
| $OP_0$ | 000011 |
| $OP_1$ | 000101 |
| $OP_2$ | 001001 |
| $OP_3$ | 010001 |
| $OP_4$ | 100001 |
| $OP_5$ | 001010 |
| $OP_6$ | 010010 |
| $OP_7$ | 100010 |
| $OP_8$ | 001100 |
| $OP_9$ | 010100 |
| $OP_{10}$ | 100100 |
| $OP_{11}$ | 011000 |

The output position $OP_{12}$ is characterized by the code representation 000000.

The differents bits of the output information read from a cheque are serially introduced in a shift register (not shown) of the type disclosed in the Belgian Patent No. 577,750 (U.S. appl. No. 806,161). (J. Toussaint, 2) and in a manner described in this patent. This shift register comprises six serially connected bistable devices the outputs of which are connected to the first input leads $d_1$ to $d_6$ of the two-input coincidence gates $G_1$ to $G_6$ associated with the bistable devices $B_1$ to $B_6$ respectively. Hereby an input $d_{1-6}$ is activated when the bit stored in the corresponding stage of the shift register is a 1, whereas it is deactivated when this bit is a 0; e.g., when the representation stored in the shift register represents $OP_4$ (100001) the leads $d_1$ and $d_6$ are activated, whereas the leads $d_2$ to $d_5$ are deactivated.

To each of the registers $R_0$, $R_1$, $R_2$, $R_3$, $R_4$, $R_5$, $R_6$, $R_7$, $R_8$, $R_9$, $R_{10}$, $R_{11}$ and $R_{12}$, there is associated a six-input coincidence gate (not shown) controlled by the bistable devices included in the respective register in such a manner that it delivers an active output signal only when the output information registered in the register stage corresponds to the output position through which the associated jacket is passing. This gate has not been shown since it is analogous to the one shown in the above Belgian Patent No. 577,750. In this patent a gate is associated to a register stage or tetrad of a shift register for checking the presence in this register stage of a particular digit or stop symbol.

The output of each of the above six-input coincidence gates is connected via an amplifier to one end of the winding of the points electromagnet forming part of the points mechanism mounted in the associated output position, the other end of this winding being connected to a suitable D.C. potential which has such a value that the points electromagnet is operated when the output of the six-input coincidence gate is activated. For instance the six-input coincidence gate associated to the output position $OP_1$ is controlled by the 0-outputs of the bistable devices $B_{13}$, $B_{14}$, $B_{15}$, $B_{17}$ and by the 1-outputs of the bistable devices $B_{16}$ and $B_{18}$. In this manner, when the output representation 000101 is registered in the $R_1$ register stage $B_{13-18}$ the output of the six-input gate associated to this register stage is activated and the points electromagnet of the points mechanism of the output position $OP_1$ is energized.

Similarly the output of register $R_2'$, but not that of register $R_2$, is coupled through a six-input coincidence gate to control the points mechanism in position $OP_2$ if the bistable devices $B_{25-30}$ are respectively in the states 001001.

It should be remarked, that the determination of the output representation is made before the trailing edge of the associated jacket leaves the photocell $PhR$. At this moment the output of the photocell $PhR$ is activated, triggering monostable device $MS_1$ into its unstable condition for 1 ms., after which an actauting output trigger pulse appears, for example, at the outputs of gates $G_1$ and $G_6$ to trigger the bistable devices $B_1$ and $B_6$ to their 1-condition, if, for example, the representation for $OP_4$ is to be stored in the register stage R; and the output leads $b_1$ and $b_6$ are thus activated.

When the leading edge of the jacket under consideration passes in front of the photocell $PhR_0$, the inverted (inverter $I_1$) output of this photocell is activated triggering monostable device $MS_2$ into its unstable 1-condition for 1 millisecond. The 0-output of monostable device $MS_2$ is connected to one of the input leads of each of the two-input coincidence gates $G_7$, $G_{7'}$, to $G_{12}$, $G_{12'}$, associated with the bistable devices $B_7$ to $B_{12}$ respectively and included in the register stage $R_0$. Hence an active trigger pulse will appear after 1 millisecond, at the outputs of those coincidence gates at which the other inputs are activated. This is the case, in the above example, for $OP_4$, at the outputs of the gates $G_{7'}$ and $G_{12'}$, since the bistable devices B1 and B6 are in their 1-conditions so that the bistable devices $B_7$ and $B_{12}$ are also triggered to their 1-condition. This means that the information recorded in the register stage R has been transferred to the register stage $R_0$ by means of an advancing pulse delivered by the monostable device $MS_2$ under the control of the leading edge of the jacket itself. It should also be noted that this same advancing pulse resets the bistable devices $B_1$ to $B_6$ of the register stage R to their 0-conditions.

Since, as indicated above, the jackets are periodically delivered to the edgewise conveyor by means of a periodically operating input mechanism, (in particular, one operating every 140 milliseconds to deliver a jacket when one is available) the distances between consecutive jackets should theoretically all be identical. However, as indicated above, these distances may vary and therefore a circuit has been provided for checking, in the intermediate position IP, the space between two consecutive jackets. This circuit includes a photocell $PhR'$ mounted at 6.7 cm. distance from the photocell $PhR$, this distance representing the minimum allowable separation between consecutive jackets. The output of the photocell $PhR'$ is connected to the 1-input of the monostable device MS5, which does not include a differentiator circuit and the 1-output of MS5 is connected to one input of a two-input coincidence gate $G_{39}$, the other input of which is conditioned by the inverted output (inverter $I_2$) of the photocell $PhR$.

The output of the gate $G_{39}$ is connected to the 1-input of the monostable device $MS_6$, the 1-output of which is connected to the first inputs of the two-input coincidence gates $G_{45}$ and $G_{46}$, the second inputs of which are controlled by the 0-outputs of the monostable devices $MS_1$ and $MS_2$ respectively. The output of gate $G_{45}$ is connected to the 0-inputs of the bistable devices $B_{1-6}$ of the register stage R, whereas the output of gate $G_{46}$ is connected to the 1-input of the monostable device $MS_7$. The 0-output of monostable device $MS_7$ is connected to the 0-inputs of the bistable devices $B_{7-12}$ of the register stage $R_0$.

Considering two consecutive jackets, the first one (in the direction of travel) will trigger the monostable device $MS_5$ to its unstable condition for 10 microseconds when it leaves the photocell $PhR'$ and this 10 microseconds impulse activates one input of the gate $G_{39}$. The other input of this gate $G_{39}$ is activated only if the above second jacket is passing in front of the photocell $PhR$. Hence only if the first jacket leaves the photocell $PhR'$ while the second jacket is in front of the photocell $PhR$, will the output of the gate $G_{39}$ be activated during the 10 microsecond operation of $MS_5$. This means however that the distance between the two jackets is then smaller than the required minimum distance of 6.7 cm. and therefore both jackets will be rejected in a manner described hereinafter.

It should first be remarked that when the output of coincidence gate $G_{39}$ is activated for 10 microseconds, only the output information concerning the above first jacket has reached the register stage R, as the above second jacket has not yet passed the photocell $PhR$.

The above 10 microsecond pulse at the output of gate $G_{39}$ is applied to the above monostable device $MS_6$ which is thus triggered to its 1-condition for 110 milliseconds.

At the moment the first jacket reaches the photocell $PhR_0$, the information concerning the first jacket is shifted from register stage R to register stage $R_0$ by a pulse delivered by monostable device $MS_2$, in the manner described above. Immediately afterwards however, this information in register $R_0$ is replaced by an error number by the resetting of the bistable devices $B_7$ to $B_{12}$ of the register stage $R_0$ to their 0-conditions.

Indeed the monostable device $MS_7$ is triggered to its 1-condition for 10 microseconds at the moment the monostable device $MS_2$ delivers a pulse, by the pulse appearing at the output of the two-input coincidence gate $G_{46}$. At the moment the monostable device $MS_7$ returns to its 0-condition the bistable devices $B_{7-12}$ are triggered to their 0-conditions.

One millisecond after the second jacket leaves the photocell $PhR$, the error number is also entered into the register stage R, by the pulse appearing at the output of the gate $G_{45}$ when the monostable device $MS_1$ returns to its stable condition.

Hence, following these operations the register stages R and $R_0$ both contain the error number 000000 and both jackets will be rejected since this error number corresponds to position $OP_{12}$ and therefore the points mechanism mounted in the output position $OP_{12}$ will be operated as each of the two jackets approaches the position $OP_{12}$. It will be explained below why both jackets instead of only the second one are rejected.

In connection with the above, it should further be noted that the first jacket will always reach the photocell $PhR_0$ before the second jacket leaves the photocell $PhR$, since the distance between the leading edge of the first jacket and the trailing edge of the second jacket is at least 60 cm. whereas the distance between the photocells $PhR$ and $PhR_0$ is equal to 58.3 cm. Thus the information associated with the first jacket will always be transferred to register $R_0$ before that associated with the second jacket is entered into register R.

The operation of a unit, such as defined above, will now be described in detail. Such a unit comprises registers $R_1$ and $R_2$ to which are respectively associated photocells $PhR_1$ and $PhR_2$, and output positions $OP_1$ and $OP_2$, and a buffer register $R_2'$ connected to the output of register $R_2$.

These registers are identical to the register stage $R_0$ and the gates connected to the bistable devices therein are controlled by the outputs of the preceding and corresponding bistable devices e.g. the gates $G_{19}$, $G_{19'}$ connected to the bistable device $B_{19}$ are controlled respectively by the outputs $a_{13}$ and $b_{13}$ of the preceding and corresponding bistable device $B_{13}$, and so forth.

The case will be described wherein a first jacket is moving in front of the photocell $PhR_2$, while simultaneously a second jacket is moving in front of the photocell $PhR_1$.

As long as the jackets are simultaneously in front of the respective photocells $PhR_1$ and $PhR_2$, the inputs of the two-input mixer $M_1$ are deactivated, so that the output of mixer $M_1$ is also deactivated. The latter output is activated only when one or both of the photocells $PhR_1$ and $PhR_2$ is exposed to light. When jackets are moving in front of the photocells $PhR_1$ and $PhR_2$, the output of the two-input coincidence gate $G_{31}$ is also deactivated and this output is reactivated only when both photocells are coincidentally exposed to light.

At the moment one of the two jackets leaves its photocell e.g. when the first jacket leaves its photocell $PhR_2$, the output of the mixer $M_1$ is activated, and due to this the bistable device $B_{31}$ is triggered to its 1-condition, and one common input of the two-input coincidence gate $G_{32}$ is activated.

Due to the bistable device $B_{31}$ being in its 1-condition one input of the two-input mixer $M_2$ is activated, thus activating the output of this mixer and hence the other input of the gate $G_{32}$.

Due to the activation of both inputs of gate $G_{32}$, monostable devices $MS_3$ and $MS_4$ are triggered to their unstable 1-conditions for 1 and 56 milliseconds, respectively.

It should be remarked that if the output of gate $G_{31}$ is activated at the moment the second jacket leaves the photocell $PhR_1$, this remains without influence on the output of the mixer $M_2$ which is already activated.

From the above it follows that the arrangement including bistable device $B_{31}$, mixers $M_1$, $M_2$ and gates $G_{31}$, $G_{32}$, comprises the above comparison means since it indicates only the first detection of a document travelling in front of the associated detecting means (photocells) even if a plurality of such documents are being detected.

From the following it will become clear that the monostable devices $MS_3$ and $MS_4$ constitute the advancing means whereas $MS_4$ moveover constitutes a delay means.

The case will now be described where only one jacket is moving in front of one of the photocells $PhR_1$, $PhR_2$ e.g. only a jacket is moving in front of $PhR_1$.

Due to no jacket being in front of the photocell $PhR_2$, the output of the mixer $M_1$ remains activated so that $B_{31}$ will be triggered; hence also the first input of gate $G_{32}$ is activated.

As the jacket moves in front of $PhR_1$, the output of gate $G_{31}$ is deactivated and since also the bistable device $B_{31}$ is in its 0-condition due to a previous output from $MS_4$, the output of the mixer $M_2$ is deactivated.

At the moment the above jacket leaves the photocell $PhR_1$, the output of the gate $G_{31}$ becomes activated, thus activating the output of the mixer $M_2$. Consequently the second input of the gate $G_{32}$ is activated.

Due to the first input of gate $G_{32}$ being already activated the output thereof is activated. Hence the monostable devices $MS_3$ and $MS_4$ are triggered to their 1-conditions for 1 and 56 milliseconds respectively.

The 0-output of the monostable device $MS_3$ is connected to the common inputs of the coincidence gates associated to the bistable devices $B_{13-18}$ and $B_{19-24}$, respectively included in the register stages $R_1$ and $R_2$. After 1 millisecond an active trigger pulse appears at the 0-output of monostable device $MS_3$ and the information will then be transferred from the register stage $R_0$ to the register stage $R_1$ and from the register stage $R_1$ to the register stage $R_2$.

The 0-output of monostable device $MS_4$ is connected to the common input of the coincidence gates associated with the bistable devices $B_{25-30}$ included in the buffer stage $R_2'$ and to the 0-input of the bistable device $B_{31}$. After 56 milliseconds an active trigger pulse appears at the 0-output of monostable device $MS_4$ and the information stored in the register stage $R_2$ will therefore be transferred to the buffer stage $R_2'$, and the bistable device $B_{31}$ will be trigged back to its 0-condition.

Summarizing, the fastest moving of two jackets or, eventually, a single jacket travelling in front of the photocells $PhR_1$ and $PhR_2$ controls the transfer of information from the register stage $R_0$ to the register stage $R_1$ and simultaneously from the register $R_1$ to the register stage $R_2$, this transfer being executed 1 ms. after this jacket leaves its photocell. The fastest jacket also controls the transfer of information from the register stage $R_2$ to the above buffer stage $R_2'$, 56 ms. after that jacket leaves its photocell.

The above 56 milliseconds delay has been chosen to operate compatibly with an input mechanism which transfers a jacket from the transverse conveyor to the edgewise conveyor every 140 milliseconds. This value is sufficient since the fastest jacket of a pair of jackets moving, for example, past $PhR_1$ and $PhR_2$, cannot have an advancement, with respect to the fastest jacket of the preceding pair of jackets, which is equal to 56 milliseconds or 16 cm. Indeed, the maximum advancement is obtained when the jackets of both pairs are separated by the minimum distance in which case the information concerning said preceding pair of jackets is transferred from the buffer stage $R_2'$ $$56-\frac{(80-73.4)140}{40}=32.9 \text{ milliseconds}$$

before the information concerning the other pair of jackets is entered in this buffer stage.

It should be remarked that the distance between two jackets as determined in the intermediate position IP by means of the photocells $PhR$ and $PhR'$ may be decreased during the transfer of the jackets along the conveyor. This distance cannot become too small since a faulty operation would occur. Indeed, let us consider a first jacket moving in front of the photocell $PhR_{12}$ and a second jacket moving in front of the photocell $PhR_{11}$ and suppose further that the first jacket is considerably delayed relative to the second jacket (i.e. the two jackets are less than 10 cm. apart). Suppose also that upon the trailing edge of the second jacket leaving the photocell $PhR_{11}$, it is decided that this jacket must be transferred to the output position $OP_{11}$; in this case the electromagnet controlling the diverter plate P of the points mechanism mounted in the output position $OP_{11}$ is operated.

Due to the first jacket having a considerable delay with respect to the second one, it may happen that the diverter plate P comes into contact with the fixed plate of the edgewise conveyor EC before the above first jacket has passed this place of contact. In this case the trailing edge of the first jacket will then be seized and stopped between these plates.

Such a jamming would for instance occur in the case that it has been detected, by means of the photocells $PhR$ and $PhR'$, that the distance between two consecutive jackets is too small and if one would then try to reject the second jacket only at $OP_{12}$. Indeed, in this case the trailing edge of the first jacket will be seized between the fixed plate of the conveyor and the diverter plate of the points mechanism. Due to the second jacket travelling at its normal speed jamming will occur.

It is clear that if no precautions are taken other jackets following the second jacket may jam; therefore a jamming detection circuit has been provided for stopping the machine immediately after jamming has occurred and even for stopping the machine when the distance between two jackets becomes too small.

It may be asserted that since jamming is always caused by the distance between two consecutive jackets being too small, it would be sufficient to increase this distance. However, for a given jacket length this requires a reduction of the speed of the input mechanism and therefore an increase in the length of the machine since the minimum width between two consecutive output positions must be equal to the distance between two consecutive jackets. Such a reduction in the operation speed of the machine and such an increase of the length thereof are naturally not desirable. Therefore another solution for the problem was necessary.

As mentioned above the jackets are regularly fed to the edgewise conveyor by means of a periodically operated input mechanism e.g. one jacket is delivered during each so-called mechanical cycle of the input mechanism, such a cycle having e.g. a duration of 140 ms.

Along the edgewise conveyor the jackets are displaced at a speed of e.g.

$$\frac{40 \text{ cm.}}{140 \text{ ms.}}$$

Due to two consecutive photocells such as $PhR_1$ and $PhR_2$ being mounted at a distance of 40 cm. from each other and the jackets having a length of about 30 cm., it is clear that each such photocell should be exposed to the light source mounted in front of it, for at least 35 ms. (10 cm.) of each mechanical cycle of 140 ms.

However, when a jacket has been erroneously stopped along the conveyor it will prevent exposure of the photocell in front of which it is situated, to the corresponding light source.

The present jamming detection circuit is based upon these considerations and detects if during a particular mechanical cycle each photocell is exposed to light during at least a small time interval. If this is not the case the machine is stopped.

Figure 3:
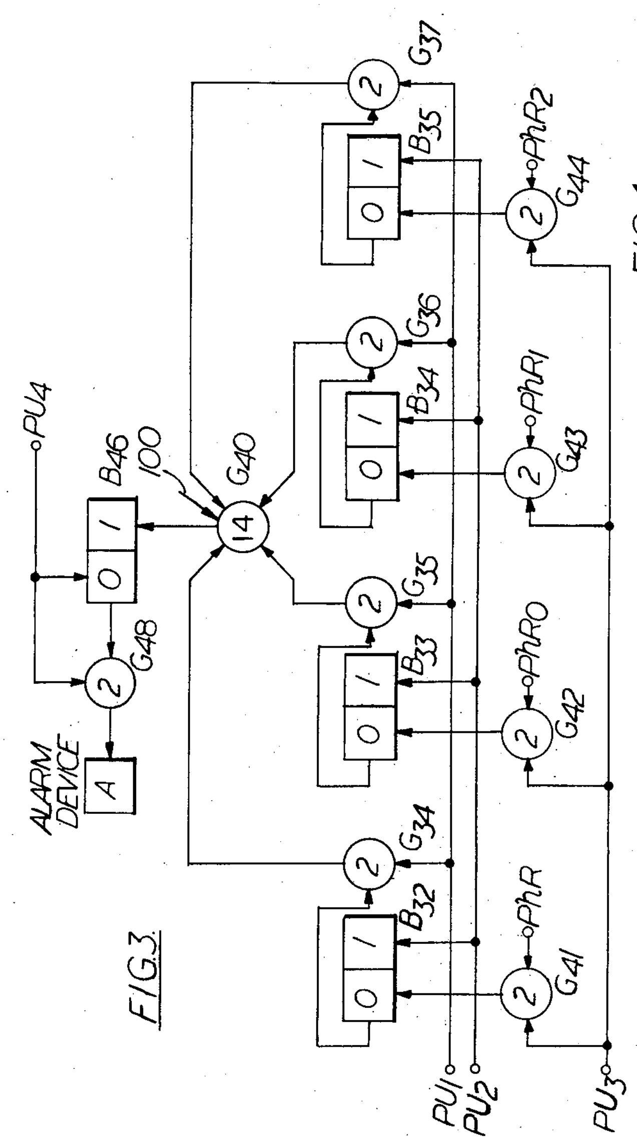
FIG. 3 is a detailed view of a jamming detection circuit included in the present machine.
Figure 4:
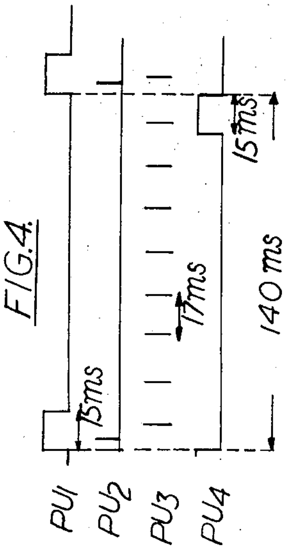
FIG. 4 is a timing diagram used to explain the operation of the circuit of FIG. 3.

Principally referring to FIGS. 3 and 4, the present jamming detection circuit includes fourteen bistable devices, only the first four of which, $B_{32}$–$B_{35}$, are shown. The devices are respectively associated with the photocells $PhR$, to $PhR_{12}$.

A first impulse source $Pu_1$ controls the one inputs of a first set of fourteen two-input coincidence gates, only the first four ($G_{34-37}$) of which are shown. The other inputs of these gates are respectively controlled by the 0-outputs of the above bistable devices. A second pulse source $Pu_2$ controls the 1-inputs of the bistable devices.

The 0-inputs of the bistable devices are controlled by a second set of fourteen outputs of the two-input coincidence gates respectively (only the first four, $G_{41-44}$, of which are shown), the inputs of which are controlled individually by the outputs of the above photocells $PhR$ to $PhR_{12}$ and in common by a third impulse source $Pu_3$.

The outputs of the first set of gates condition the inputs of the fourteen-input coincidence gate $G_{40}$, ten of which inputs are indicated schematically at 100. The output of $G_{40}$ is connected to the 1-input of the bistable device $B_{46}$. The 0-input of the latter bistable device $B_{46}$ is controlled by the fourth impulse source $Pu_4$, which also controls the one input of a two-input coincidence gate $G_{48}$, the other input of which is controlled by the 0-output of the bistable device $B_{46}$. The output of gate $G_{48}$ is connected to an alarm circuit A.

The above pulse sources $Pu_1$ and $Pu_4$ each deliver one pulse during each 140 ms. cycle, both pulses being displaced with respect to each other: the pulse delivered by $Pu_1$ arrives at the start of a mechanical cycle, whereas the pulse delivered by $Pu_4$ arrives at the end thereof.

The pulse source $Pu_2$ delivers a trigger pulse at the end of each pulse delivered by the $Pu_1$ source, whereas the pulse source $Pu_3$ delivers a pulse e.g. every 17 ms. It is clear that the pulses generated by the pulse source $Pu_2$ may be derived from the pulses generated by the pulse source $Pu_1$ e.g. by differentiation and clipping.

The operation of the above jamming detection circuit will now be described, starting at the beginning of a mechanical cycle.

Due to the 0-outputs of the bistable devices being activated, the control pulse $Pu_1$ is able to pass through the first set of gates and hence the output of the coincidence gate $G_{40}$ is activated during this control pulse $Pu_1$. The bistable device $B_{46}$ is therefore triggered to its 1-condition by the $Pu_1$ pulse, and at the end of the $Pu_1$ interval the bistable devices are triggered to their 1-conditions by the $Pu_2$ pulse.

The $Pu_3$ pulses applied to the second set of gates are only able to pass through these gates when the correspond photocells have their outputs activated i.e. when they are exposed to the light of their corresponding light sources. When this is the case the associated ones of the bistable devices which have been triggered to the 1-condition by $Pu_2$ will be brought back to the 0-condition by the first $Pu_3$ pulse applied to the associated gate in the second set of gates which includes $G_{41-44}$.

If a $Pu_4$ pulse is applied to the gate $G_{48}$, it will not be able to pass through this gate to operate the alarm device A, due to the bistable device $B_{46}$ being in its 1-condition.

However, if a jacket has been stopped in front of a photocell during at least one cycle this photocell will not be exposed to the light of its corresponding source and its output will remain deactivated.

Hence no $Pu_3$ pulse will be able to pass through the associated gate in the second set of gates, so that the associated bistable device will remain in the 1-condition. Thus the next positive $Pu_1$ pulse will not be able to pass through the associated gate in the first set of gates which includes $G_{34-37}$ so that the output of this gate will remain deactivated.

Due to the bistable device $B_{46}$ then remaining in its 0-condition the following $Pu_4$ pulse is able to pass through the gate $G_{48}$ in order to operate the alarm device A which stops the machine.

It should be remarked that when two jackets follow each other closely, a photocell in front of which they pass may only be exposed to light for a short time interval so that it may happen that during this short time interval no $Pu_3$ pulse is applied to the corresponding gate in the second set of gates. In this case the next $Pu_1$ pulse will not be able to pass through the corresponding gate in the first set of gates, so that the machine will be stopped. From this it follows that it is advantageous to make the frequency of the $Pu_3$ pulses high. Indeed, in the case of a high frequency even when there is only a small space between two consecutive jackets, the bistable devices will be brought back to their 0-condition since the output of the second set of gates will then always be activated at least during a short interval. On the contrary when the frequency is not very high it may happen that the time interval during which a photocell is exposed to light falls between two consecutive $Pu_3$ pulses so that the corresponding bistable device will remain in the 1-condition due to which the machine will be stopped.

In connection with the machine described above it should be remarked that no buffer stage is necessary between the register stages $R_0$ and $R_1$ since one is always sure that the transfer of information from $R_0$ to $R_1$ is executed before the transfer of information from R to $R_0$. Indeed, the first transfer is controlled by the trailing edge of a jacket leaving the photocell $PhR_1$, whereas the second transfer is controlled by the leading edge of a jacket arriving in front of the photocell $PhR$. The distance between two consecutive jackets being normally larger than 5 cm. which is the distance between the photocell $PhR_0$ and $PhR_1$, it is clear that the first of these two jackets will leave the photocell $PhR_1$ before the second of these jackets arrives in front of the photocell $PhR$.

Also the photocell $PhR_0$ might have been mounted at 35 cm. distance from the photocell $PhR_1$, the detection of a jacket being executed upon the jacket leaving the photocell, as in the case with the other photocells.

While the principles of the invention have been described above in connection with specific apparatus, it is to be clearly understood that this description is made only by way of example and not as a limitation on the scope of the invention.

We claim:

1. A document processing system comprising:

(*a*) conveying means for transporting loosely held articles (*b*) a series of groups of serially arranged output sorting positions arranged at given intervals along the path of movement of said conveyng means, one of said output positions constituting a reject position, (*c*) a corresponding series of register units associated with said series of output position groups, each said unit including a group of serially connected registers corresponding to the associated output position group, and all but the last said unit including a buffer register connected between the last register in said unit and the first register in the next unit, (*d*) means for storing information designating the output position destination of each article being transported on said conveying means towards the first of said output positions, (*e*) an article detecting device associated with each said output sorting position, and thus with each said register in said groups of registers (*f*) advancing means coupled to said article detecting devices for advancing the output destination information associated with detected articles into the said associated registers from the preceding registers in said series of register units, said advancing means being operative in response to the detecting device associated with the last register in each said unit to transfer the said destination information from the said last register into the said buffer register of the said unit at a predetermined time after the transfer of said information into the said last register, and (*g*) means adjacent each said output position for diverting an article from said conveying means into said adjacent output position after the information associated with said article has been entered into the register associated with said adjacent position, if the said information is representative of the said adjacent output position.

2. A system according to claim 1 wherein:

(*a*) each said group of registers comprises two registers and accordingly each said group of output positions comprises two output positions having two associated detecting devices.

3. A system according to claim 2 wherein said advancing means includes for each said unit:

(*a*) a first two-input mixer, (*b*) a first two-input coincidence gate, (*c*) said mixer and said coincidence gate being coupled to the said associated detecting devices, (*d*) a bistable device having a 1-input coupled to the output of said first mixer, (*e*) a second two-input mixer coupled to the 1-input of said bistable device and to the output of said first two-input coincidence gate, (*f*) a second two-input coincidence gate coupled to the outputs of said first and second two-input mixers, (*g*) a first monostable device having an unstable input coupled to the output of said second two-input coincidence gate, and having its stable output coupled as a shifting input to said group of two registers in the said unit, and (*h*) a second monostable device having its unstable input coupled to the output of said two-input coincidence gate and having its stable output coupled as a shifting pulse to shift information from the last register to the buffer register of said unit, and also coupled to the zero input of said bistable device.

4. A system according to claim 1 including:

(*a*) a jamming detection means comprising, (*b*) a plurality of bistable devices corresponding to said article detecting devices, (*c*) a corresponding first plurality of two-input coincidence gates having inputs individually coupled to the 0-outputs of said corresponding bistable devices, (*d*) a corresponding second plurality of two-input coincidence gates having outputs coupled individually to the 0-inputs of said bistable devices and having inputs coupled individually to the corresponding article detecting devices, (*e*) a first source of pulses coupled to the remaining inputs of said first plurality of gates, (*f*) a second source of pulses coupled to the one-inputs of all of said bistable devices, (*g*) a third source of pulses coupled to the remaining inputs of all of said second plurality of gates, (*h*) a multiple input coincidence gate having inputs individually coupled to all of the outputs of said first plurality of gates, (*i*) a bistable device having one input coupled to the output of said last mentioned coincidence gate, (*j*) a fourth source of pulses coupled to the zero-input of said last mentioned bistable device, and (*k*) alarm means coupled to the zero-output of last mentioned bistable device and to said fourth source of pulses for producing an alarm signal if all of said detecting devices fail to coincidentally produce a given signal during a predetermined interval of time.

References Cited in the file of this patent

UNITED STATES PATENTS

| | | |
|---|---|---|
| 2,963,293 | Klein | Dec. 6, 1960 |
| 2,982,404 | Harmon | May 2, 1961 |
| 2,993,596 | Steinbuch | July 25, 1961 |